United States Patent
McCullough (10) Patent No.: US 8,059,121 B2
(45) Date of Patent: Nov. 15, 2011

(54) METHOD AND AIRCRAFT DISPLAY SYSTEM FOR GENERATING THREE DIMENSIONAL IMAGE

(75) Inventor: Susan L. McCullough, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 886 days.

(21) Appl. No.: 11/857,020

(22) Filed: Sep. 18, 2007

(65) Prior Publication Data

US 2009/0073165 A1    Mar. 19, 2009

(51) Int. Cl.
*G06T 17/00* (2006.01)

(52) U.S. Cl. .......................................... 345/420

(58) Field of Classification Search ....... 703/5; 345/420
See application file for complete search history.

(56) References Cited

U.S. PATENT DOCUMENTS

| | | | |
|---|---|---|---|
| 5,926,401 A * | 7/1999 | Montag et al. | 703/5 |
| 6,621,451 B1 * | 9/2003 | Fisher et al. | 342/185 |
| 2003/0001770 A1 * | 1/2003 | Cornell et al. | 342/26 |
| 2006/0176303 A1 * | 8/2006 | Fairclough | 345/426 |

OTHER PUBLICATIONS

Drebin, R. et al. "Volume rendering," Computer Graphics, Aug. 1, 1988, pp. 65-74, vol. 22, No. 4, ACM, US.
Gelder Van, A. et al. "Direct volume rendering with shading via three-dimensional textures," Proceedings of the 1996 Symposium on Volume Visualization, Oct. 28, 1996, pp. 23-30.
Schlusselberg, D. S. et al. "Three-dimensional display of medical image volumes," Proceedings of the seventh annual conference and exposition: Computer graphics, Jan. 1, 1996, pp. 114-123, vol. 3, Anaheim, CA, US.
Kaufman, A. et al. "Volume graphics," Computer, IEEE Service Center, Jul. 1, 1993, pp. 51-64, vol. 26, No. 7.
European Search Report for Application No. 08164461.9, mailed on Feb. 16, 2009.

* cited by examiner

*Primary Examiner* — Xiao Wu
*Assistant Examiner* — Edward Martello
(74) *Attorney, Agent, or Firm* — Ingrassia Fisher & Lorenz, P.C.

(57) ABSTRACT

A rendering technique for generating a three dimensional (3D) image is provided. The technique includes the steps of collecting 3D data, writing the 3D data into texture memory as two dimensional (2D) slices, and texturizing a first set of overlapping polygons utilizing the 2D slices. The technique further includes the step of displaying the first set of overlapping texturized polygons to produce a 3D image.

18 Claims, 5 Drawing Sheets

| TEXEL VALUE | TEXEL COLOR | TEXEL TRANSLUCENCY |
|---|---|---|
| 8 | RED 2 | 0% (OPAQUE) |
| 7 | RED 1 | 10% |
| 6 | YELLOW 2 | 20% |
| 5 | YELLOW 1 | 30% |
| 4 | GREEN 2 | 40% |
| 3 | GREEN 1 | 60% |
| 2 | BLUE | 80% |
| 1 | NONE | 100% (COMPLETELY TRANSPARENT) |

METHOD AND AIRCRAFT DISPLAY SYSTEM FOR GENERATING THREE DIMENSIONAL IMAGE

TECHNICAL FIELD

The present invention relates generally to a process for generating a three dimensional image and, more particularly, to an aircraft weather display system employing such a process for generating a three dimensional weather image.

BACKGROUND

Aircraft display systems that generate two dimensional images indicative of nearby weather conditions (e.g., precipitation density) on a conventional two dimensional display (e.g., a moving map display, a vertical situation display, etc.) are known. Such aircraft display systems are well-suited for providing a pilot (or other viewer) with images indicative of two dimensional weather data of the type collected by conventional weather radar systems. However, such aircraft display systems are generally unable to express three dimensional, or volumetric, weather data in an intuitive manner. With the recent advent of vertical scanning radar systems, which collect weather data for a scanned volume of space, a need has developed for an aircraft weather display system that is capable of expressing three dimensional weather data in an intuitive and readily comprehendible manner.

While display systems capable of generating three dimensional images have been developed outside of the avionics field, such display systems are generally not amenable to implementation as an aircraft weather display system. Such three dimensional display systems typically utilize relatively complex computational processes (e.g., matrix transformations, recursive algorithms, etc.) to build the three dimensional image and consequently require a relatively large amount of memory and throughput. In addition, such conventional rendering techniques generally require a considerable length of time to render a three dimensional image. While this time delay may be acceptable in certain applications wherein the three dimensional data remains stagnant (e.g., in the case of a magnetic resonance image (MRI) of a patient's brain), such a time delay is problematic in the case of an aircraft weather display system wherein the three dimensional weather data changes rapidly and the rendering process is continually repeated.

Considering the foregoing, it is desirable to provide a rendering technique for generating a three dimensional image that requires relatively little memory and throughput and, therefore, permits a three dimensional image to be rapidly updated to reflect changes in the three dimensional data. It should further be appreciated that it would be desirable to provide an aircraft weather display system that employs such a technique to produce a three dimensional weather image indicative of volumetric weather data received from, for example, a vertical scanning radar system. Other desirable features and characteristics of the present invention will become apparent from the subsequent detailed description of the invention and the appended claims, taken in conjunction with the accompanying drawings and this background of the invention.

BRIEF SUMMARY

A rendering technique for generating a three dimensional (3D) image is provided. The technique includes the steps of collecting 3D data, writing the 3D data into texture memory as two dimensional (2D) slices, and texturizing a first set of overlapping polygons utilizing the 2D slices. The technique further includes the step of displaying the first set of overlapping texturized polygons to produce a 3D image.

An aircraft weather display system is also provided for use in conjunction with a volumetric weather data source. The aircraft weather display system includes a monitor, a texture memory, and a controller operatively coupled to the volumetric weather data source, to the monitor, and to the texture memory. The controller is configured to receive 3D data from the volumetric data source, write the 3D data into the texture memory as two dimensional (2D) slices, and generate a plurality of texturized overlapping polygons from the 2D slices. The plurality of texturized overlapping polygons collectively forms a 3D weather image.

BRIEF DESCRIPTION OF THE DRAWINGS

The present invention will hereinafter be described in conjunction with the following drawing figures, wherein like numerals denote like elements, and.

DETAILED DESCRIPTION OF AT LEAST ONE EXEMPLARY EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
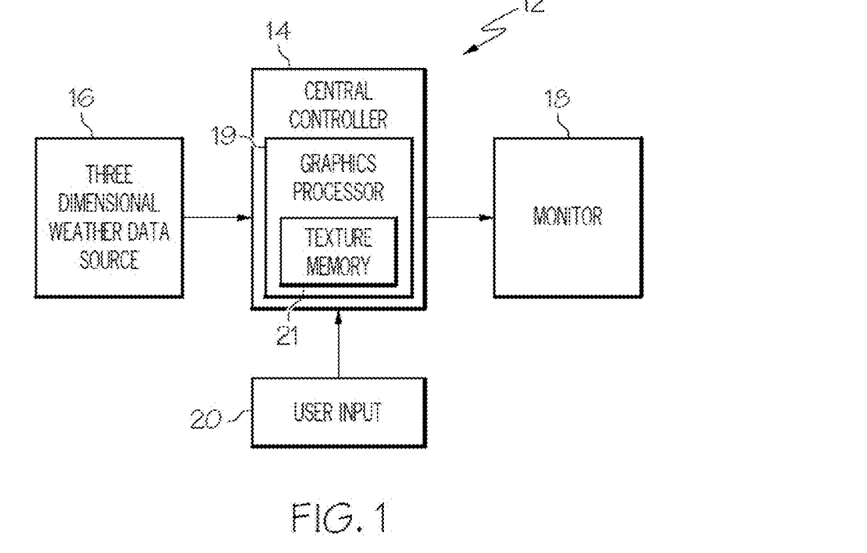
FIG. 1 is a simplified functional block diagram of an aircraft weather display system in accordance with a first exemplary embodiment.

FIG. 1 is a simplified functional schematic of a weather display system 12 suitable for deployment on an aircraft in accordance with a first exemplary embodiment. Aircraft weather display system 12 comprises a central controller 14 having an output coupled to monitor 18 and an input coupled to a graphic processor 19, which is, in turn, coupled to a three dimensional (3D) weather data source 16. If desired, weather display system 12 may also comprise a user input 20 (e.g., a keyboard, a cursor device, a rotatable knob, etc.), which may be coupled to a second input of central controller 14. As will be described in detail below, 3D weather data source 16 continually provides graphics processor 19, and therefore controller 14, with 3D weather data indicative of weather conditions in a scanned volume of atmospheric space. Controller 14 utilizes the 3D weather data provided by data source 16 to generate a three dimensional, or volumetric, weather image on monitor 18, which may be referred to by a pilot (or other viewer) to determine the location and magnitude of nearby weather conditions (e.g., storm cells). For the purposes of the present invention, 3D weather data source 16 may comprise any device (or devices) capable of providing central controller 14 with 3D weather data, including, for example, a ground-based radar system, which may communicate with central controller 14 via wireless signal. This notwithstanding, 3D weather data source 16 preferably takes the form of a vertical scanning radar system deployed onboard the aircraft. Vertical scanning weather radar systems suitable for use as 3D weather data source 16 are known and commercially available. One such system bears model number RDR-4000 and is produced by Honeywell, Inc., headquartered in Morristown, N.J.

As stated above, central controller 14 utilizes three dimensional weather data provided by 3D weather data source 16 to generate a three dimensional weather image. Specifically, central controller 14 generates a plurality of two dimensional texturized polygons that collectively form the three dimensional image. To facilitate the texturizing of the polygons, central controller 14 is associated with graphics processor 19, which contains texture memory 21 (FIG. 1). In addition to graphics processor 19 and texture memory 21, central controller 14 may be associated with any number of electronic components suitable for processing the 3D weather data received from data source 16 and generating a 3D weather image on monitor 18. In this respect, central controller 14 may be associated with any number of individual microprocessors (e.g., graphical processing units), flight control computers, navigational equipment, memories, power supplies, storage devices, interface cards, and other standard components known in the art. Furthermore, central controller 14 may include or cooperate with any number of software programs (e.g., avionics display programs) or instructions designed to carry out the various methods, process tasks, calculations, and control/display functions described below.

Figure 2:
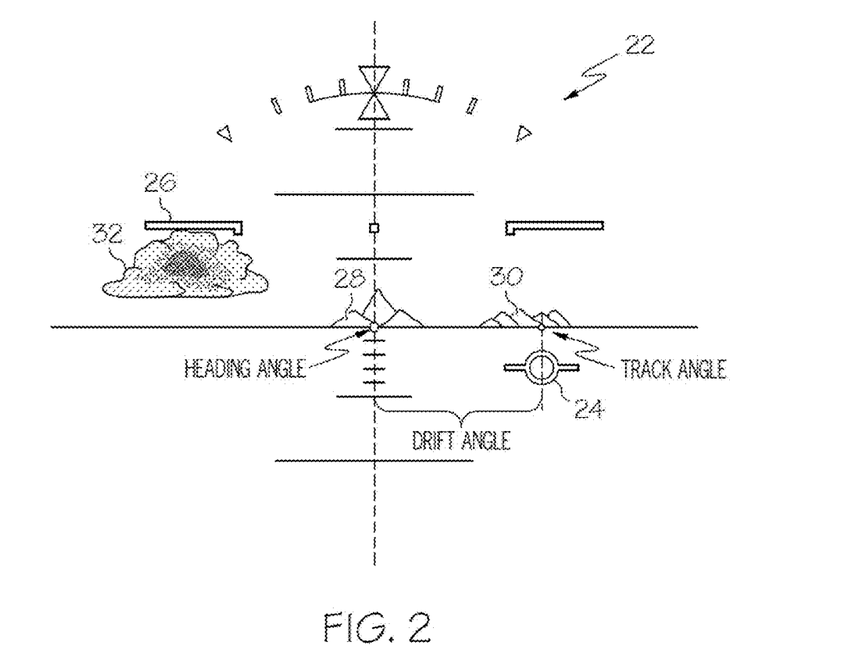
FIG. 2 illustrates one manner in which a three dimensional weather image may be incorporated into a perspective display.

Monitor 18 may comprise any image-generating device capable of being deployed on an aircraft (e.g., cathode ray tube, liquid crystal, active matrix, and plasma devices). Monitor 18 may be associated with other navigational and information systems generally deployed on aircraft and utilized to display a variety of images in conjunction with the 3D weather images described below. For example, monitor 18 may be incorporated into an aircraft's integrated primary flight display (IPFD®) system (IPFD® is a registered trademark of Honeywell International, Inc). In a preferred embodiment, central controller 14 generates a three dimensional perspective display of the aircraft's flight path on monitor 18. FIG. 2 illustrates an exemplary perspective display 22 that central controller 14 may generate on monitor 18. Perspective display 22 may be centered with respect to the heading (or heading angle) of the aircraft (i.e., the direction in which the aircraft nose is pointed) or some other flight parameter (e.g., aircraft track). In this example, the track of the aircraft (i.e., the direction in which the aircraft is traveling) is indicated by a flight path symbol 24, and the attitude of the aircraft is indicated by an attitude symbol 26. Geographical features (e.g., terrain) appearing on perspective display 22 are shown as three dimensional rendered or "synthetic" objects, such as first and second mountain ranges 28 and 30.

In accordance with an exemplary embodiment, controller 14 further generates at least one three dimensional weather image on monitor 18. As indicated in FIG. 2 at 32, this three dimensional weather image may be integrated into perspective display 22 utilizing, for example, a real world coordinate system. By integrating the three dimensional weather image into a perspective display (e.g., perspective display 22), aircraft weather display system 12 may graphically express the three dimensional data collected by weather data source 16 in a manner that permits a pilot (or other viewer) to readily determine the position and magnitude of significant weather conditions (e.g., storm cells) relative to the aircraft's position, heading, and track.

Figure 3:
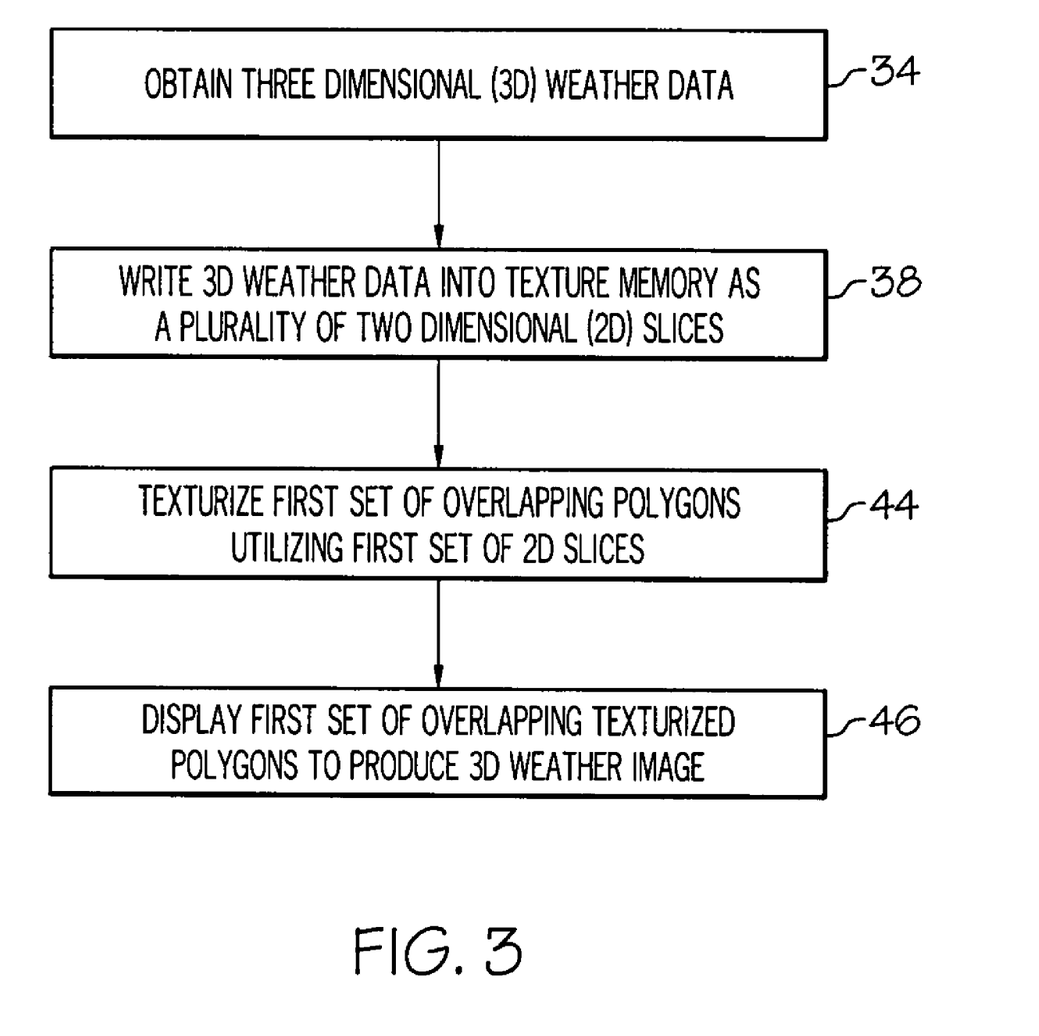
FIG. 3 is flowchart illustrating an exemplary rendering technique that may be carried out by the aircraft weather display system shown in FIG. 1.
Figure 4:
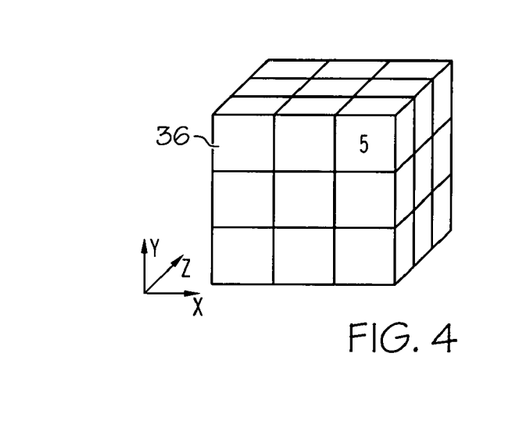
FIG. 4 is an isometric view of an X-Y-Z matrix representing three dimensional weather data.

FIG. 3 is a flowchart illustrating a first exemplary process that may be carried out by central controller 14 of aircraft weather display system 12 (FIG. 1) to generate a 3D weather image on monitor 18. To commence (STEP 34), controller 14 collects 3D weather data from a three dimensional weather source, such as vertical scanning radar system 16 (FIG. 1). The 3D weather data collected by controller 14 may take any desired form and may be indicative of a variety of different weather characteristics (e.g., water density, precipitation type, turbulence, etc.). As indicated in FIG. 4, this 3D weather data may be graphically represented as a three dimensional X-Y-Z data matrix 36. For ease of discussion, data matrix 36 is illustrated as containing a relatively small group of data points. The value of each data point in matrix 36 represents a measured weather characteristic for a scanned volume of space. In this simplified example, each data value may be three bits in size and have a decoded value ranging from 1-8 (only the value of the data point in the upper right hand corner of matrix 36 is shown for clarity). A data value of 1 may represent little to no reflectivity in a volume of space (and, therefore, a low water density), and a data value of 8 may represent high reflectivity (and, therefore, a high water density). This example notwithstanding, it should be appreciated that X-Y-Z matrix 36 will generally contain a relatively large number of data points, which may each be greater (or less) than three bits in size.

Figure 5:
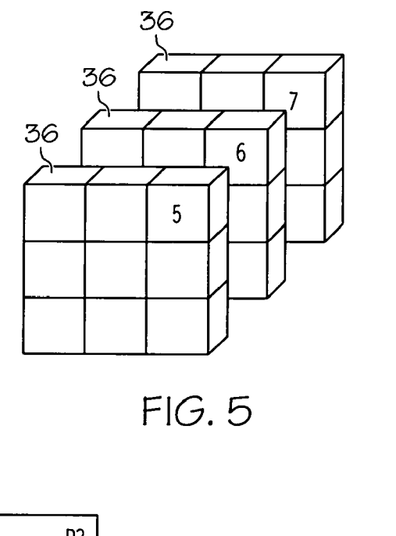
FIG. 5 is an isometric view of the X-Y-Z matrix shown in FIG. 4 illustrating one manner in which the matrix may be segmented into multiple slices.
Figure 6:
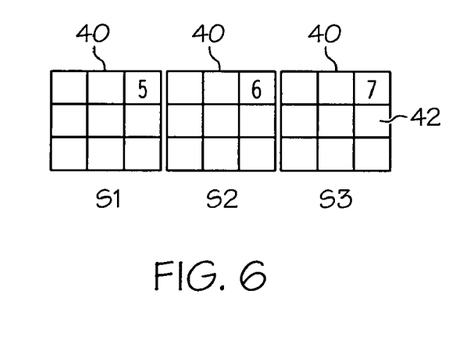
FIG. 6 is a plan view of the two dimensional slices of the X-Y-Z matrix shown in FIG. 5 written into texture memory.
Figure 7:
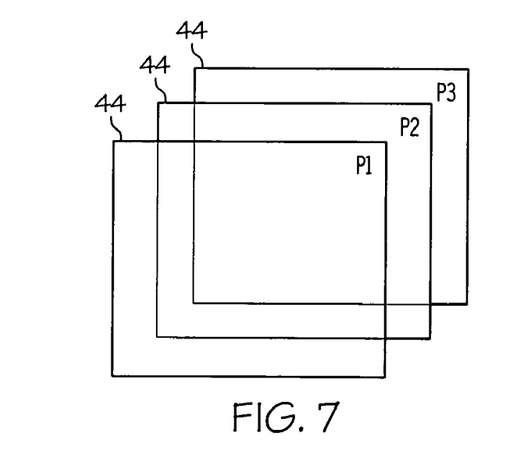
FIG. 7 is an isometric view of a set of overlapping polygons onto which textures produced from the two dimensional slices shown in FIG. 6 may be mapped.

After collecting the 3D weather data (STEP 34 in FIG. 3), controller 14 next writes the 3D data into texture memory 21 as a plurality of two dimensional (2D) slices (STEP 38). For example, as illustrated in FIG. 5, controller 14 may segment data matrix 36 along at least one axis (e.g., the Z-axis) into a number of slices 40. Then, as illustrated in FIG. 6, controller 14 may write each 2D slice 40 into texture memory 21 (FIG. 1). When written into texture memory 21 in this manner, each data point in data matrix 36 is stored as one texel 42. Collectively, the texels 42 contained within each 2D slice 40 define a texture. Next, during STEP 44, each of these textures is mapped onto a different polygon in a set of overlapping polygons. FIG. 7 is an isometric view of an exemplary set of overlapping polygons P1-P3 onto which textures created from 2D slices 40 (FIG. 6) may be mapped. In particular, slices S1, S2, and S3 may be mapped onto polygons P1, P2, and P3, respectively, to produce a set of overlapping texturized polygons. The overlapping texturized polygons are then displayed to produce a 3D weather image (STEP 46) as described more fully below.

The arrangement of overlapping polygons P1-P3 (FIG. 7) is dependent upon that manner in which the 3D data was segmented during STEP 38 (FIG. 3). In one option, the overlapping polygons are spaced apart along the same axis (or axes) along which the three dimensional weather data was segmented to produce the plurality of 2D slices. For example, as may be appreciated by comparing FIGS. 5 and 7, overlapping polygons P1-P3 (FIG. 7) may be spaced apart along the Z-axis, which is the same axis along which data matrix 36 was divided to produce 2D slices 40 (FIGS. 5 and 6). Thus, due to this arrangement of overlapping polygons P1-P3, data matrix 36 is effectively reconstructed as a three dimensional image when polygons P1-P3 are texturized utilizing texels 42 contained within 2D slices 40. However, when only utilizing a single set of overlapping polygons, the three dimensional nature of the resulting weather image will be somewhat limited; thus, it is preferred that multiple sets of overlapping polygons are utilized to build the weather image as described below in conjunction with FIGS. 10-12.

Figure 8:
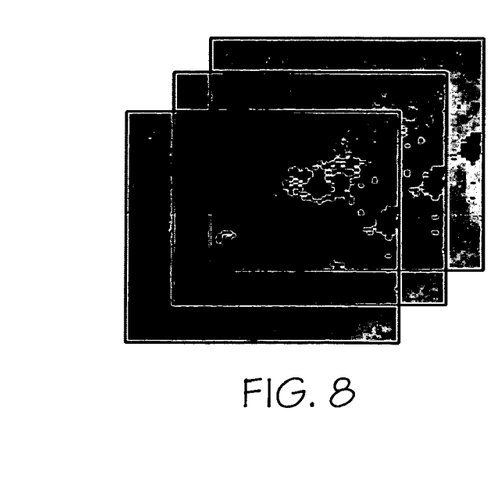
FIG. 8 is an isometric view of the set of overlapping polygons shown in FIG. 7 after texture mapping.
Figure 9:
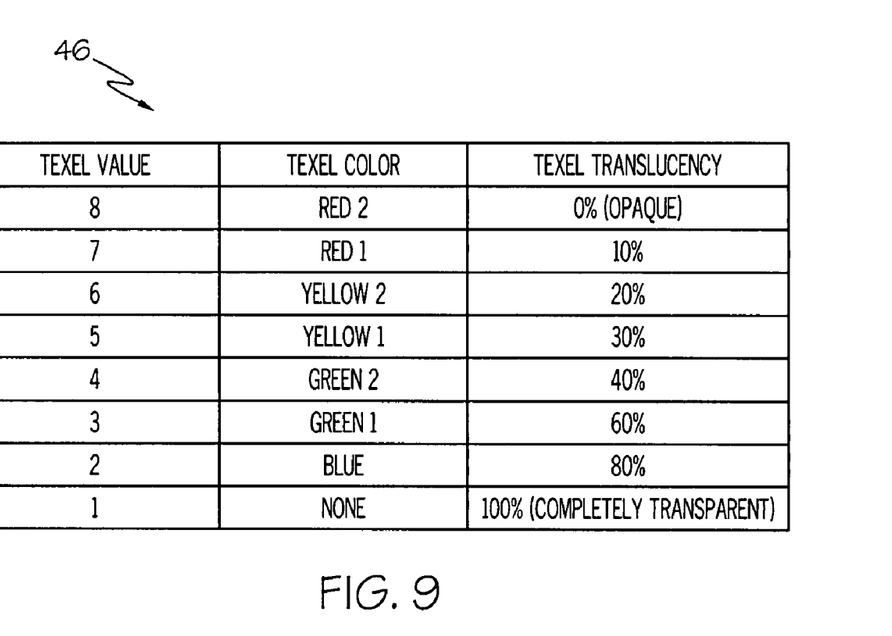
FIG. 9 is a two dimensional look-up table that may be utilized to determine texel color and/or translucency level.

FIG. 8 provides an example of one manner in which the overlapping polygons P1, P2, and P3 may appear after texture mapping. As can be seen in FIG. 8, each texturized overlapping polygon (or a portion thereof) will typically be at least partially transparent. That is, the texels utilized to map polygons P1-P3 will each have some level of translucency associated therewith. The translucency of polygons P1-P3 may be a defined parameter, which is stored in a memory associated with central controller 14 (FIG. 1). In comparison, the translucency level of each texel 42 is determined in relation to the texel's value. For example, controller 14 may determine the translucency value utilizing a look-up table associating each possible texel values with a different translucency value. To further illustrate this point, FIG. 9 illustrates a table 46 associating a plurality of translucency levels (0%-100%) with the possible decoded values for a three bit texel.

In a preferred embodiment, each texel 42 also has a texel color associated therewith. As was the case with the translucency level, the texel color will generally be determined in relation to the texel's value. Controller 14 may determine texel color utilizing a conventional color modeling systems (e.g., a 32-bit RGB alpha system). Alternatively, controller 14 may determine texel color utilizing a two dimensional look-up table, such as table 46 (FIG. 9). The color mapping scheme utilized may, of course, be varied as desired; however, the color mapping scheme is preferably similar to those conventionally employed in weather radar applications. Similarly, the translucency scheme may also be varied as desired; however, it is preferred that the texel translucency level decreases as the intensity of the measured weather characteristic increases. For example, as indicated in table 46, a texel having a value of 8, which is associated with a high water density, may have a translucency level of 0% (opaque). In comparison, a texel having a value of 1, which is associated with a low water density, may have a translucency value of 100% (completely transparent). As a result of such a translucency scheme, the texels representing intense weather characteristics will appear relatively opaque when displayed, while the texels representing mild weather characteristics will appear relatively transparent. Consequently, a pilot is able to effectively look through mild weather conditions (expressed as highly transparent texels) and observe significant weather conditions (expressed as slightly transparent texels) developing beyond the mild weather conditions.

By indirectly referencing texel values in the source data (e.g., data matrix 36) as described above, the memory and throughput requirements placed on aircraft weather display system 12 are significantly reduced. As a result, controller 14 may rapidly update the 3D weather image to reflect changes in the volumetric weather data received from 3D data source 16 without utilizing complex matrices transformation associated with traditional volumetric rendering techniques. Furthermore, due to the utilization of programmable texture hardware permitting indirect texture mapping, the polygons may be rendered "offline" without increasing computational demands on the processor. Source data (e.g., data matrix 36) may be refreshed as needed, and rendered polygons may be automatically updated utilizing a unique address associated with each texel. As noted above, controller 14 assigns each texel a translucency level in relation to the magnitude of the measured weather characteristic corresponding to that particular texel; however, it will be appreciated that each texel may be indirectly referenced within the texture memory. Consequently, the step of assigning need only be performed once per source refresh even though the texel's translucency value exists in multiple slices. In addition, it will be appreciated that controller 14 may refresh the texturized polygons in any desired order. For example, the texturized polygons closest to the aircraft's nose may be refreshed before updating the polygons further away therefrom.

In contrast to known rendering processes that render only the outer surface of a three dimensional object, the exemplary graphical rendering process builds the 3D weather image from multiple layers of texturized polygons. As a result, the 3D weather image may be readily displayed from any desired vantage point, including vantage points located within the scanned volume of space. Thus, if an aircraft equipped with weather display system 12 were to fly through the scanned volume of space, controller 14 may simply display the appropriate polygons (e.g., those corresponding to space in front of the aircraft's nose) to provide the pilot with an internal view of the 3D weather image.

Figure 10:
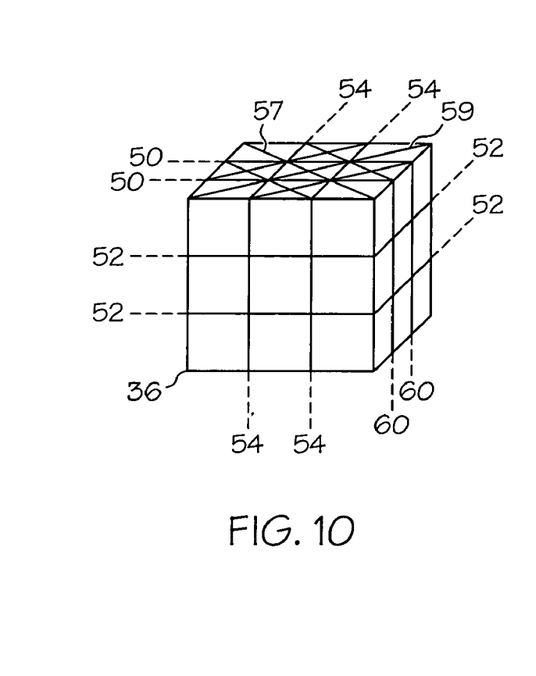
FIG. 10 is an isometric X-Y-Z matrix shown in FIG. 4 illustrating a second manner in which the matrix may be sliced.
Figure 11:
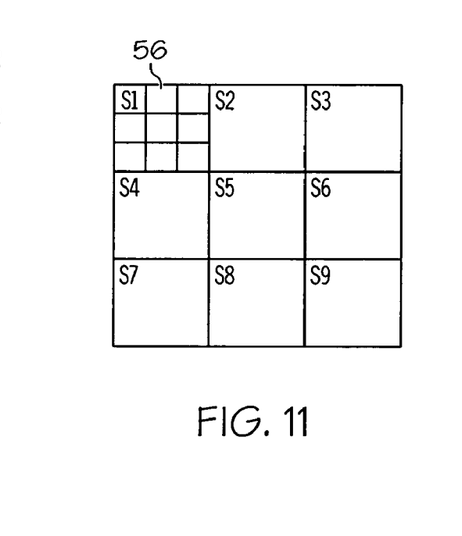
FIG. 11 is a plan view the two dimensional slices of the X-Y-Z matrix shown in FIG. 10 written into texture memory.

In the foregoing example, 2D slices were produced by slicing 3D weather data along a single axis (i.e., the Z-axis) and utilized to texturize to a single set of overlapping polygons. While this process is suitable for producing a three dimensional weather image, the resulting weather image may appear broken when viewed from certain viewing angles. For this reason, it is desirable to produce the 2D slices by slicing the 3D weather data along two or more axes and utilizing the resulting 2D slices to texturize two or more sets of overlapping polygons. To further illustrate this point, FIG. 10 provides an isometric view of a group of 3D weather data (again, represented by X-Y-Z matrix 36), which is segmented along three axes; i.e., the Z-axis (indicated by dashed lines 50), the Y-axis (indicated by dashed lines 52), and the X-axis (indicated by dashed lines 54). As shown in FIG. 11, the resulting 2D slices of data matrix 36 may be stored in a texture memory (e.g., texture memory 21 shown in FIG. 1) as a plurality of 2D slices: i.e., (1) a first set of slices (S1-S3), (2) a second set of slices (S4-S6), and (3) a third set of slices (S7-S9), respectively.

Figure 12:
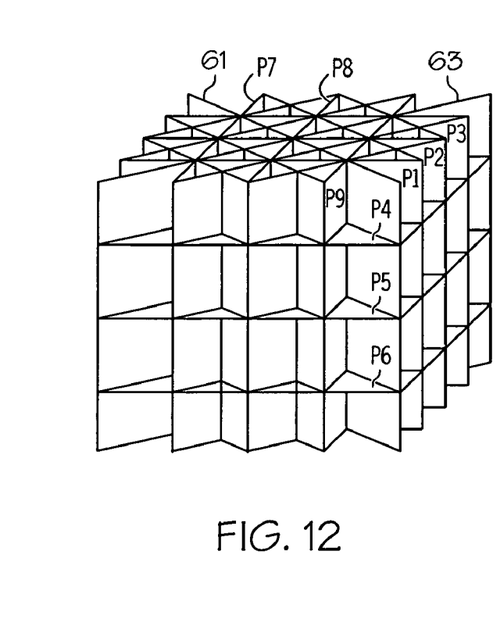
FIG. 12 is an isometric view of three sets of overlapping polygons onto which textures produced from the two dimensional slices shown in FIG. 11 may be mapped.

Slice S1-S9 each contain a plurality of texels 56 (only shown for slice S1), which collectively define a texture that may be mapped to a polygon in the manner described above. FIG. 12 is an isometric view of three sets of overlapping polygons (i.e., polygons P1-P3, P4-P6, and P7-P9) onto which the textures defined by slices S1-S9 may be mapped. In particular, the texture defined by slice S1 may be mapped to polygon P1, the texture defined by slice S2 may be mapped to polygon P2, and so on. It should be noted that each set of polygons (i.e., polygons P1-P3, P4-P6, and P7-P9) transects, and is substantially perpendicular with, the other sets of polygons. Furthermore, each polygon set is spaced along one of the axes along which data matrix 36 was divided; e.g., polygon set P1-P3 may be spaced apart along the Z-axis (i.e., the axis along which 3D data matrix was segmented to produced slices S1-S3), polygon set P4-P6 may be spaced apart along the X-axis (i.e., the axis along which 3D data matrix was segmented to produced slices S4-S6), and polygon set P7-P9 may be spaced apart along the Y-axis (i.e., the axis along which 3D data matrix was segmented to produced slices S7-S9). In a preferred embodiment, data matrix 36 may be sliced along still further axes (e.g., one or more axes forming a 45 degree angle with the X-, Y-, or Z-axis), and the 2D slices may be utilized to texture a corresponding set of overlapping polygons. For example, data matrix 36 may also be segmented along fourth and fifth axes as indicated in FIG. 10 at 57 and 59, respectively, and stored in texture memory 21 as two additional sets of slices. The two additional sets of slices may then be utilized to texturize two additional polygon sets, such as those shown in FIG. 12 at 61 and 63.

Due to the above-described arrangement of polygons P1-P9, data matrix 36 is effectively reconstructed as a three dimensional weather image when polygons P1-P9 are texturized in accordance with texels 56 contained within slices S1-S9. When comprised of multiple intersecting polygon sets in this manner, the 3D weather image may appear as a substantially solid object from a variety of viewing angles. In the aircraft context, this is especially desirable as the 3D weather image may be continually reoriented in relation to the aircraft's nose or another aircraft flight parameter (e.g., the aircraft's flight plan, flight path, required navigational performance corridor, etc.). Alternatively, the 3D weather image may be filtered and redrawn in relation to user input received from user input 20 (FIG. 1). As was the case previously, this exemplary rendering technique minimizes computational requirements and consequently permits the 3D weather image to be rapidly updated to reflect changes in the 3D weather data. As a further advantage, the exemplary rendering technique also permits the 3D weather image to be readily displayed from an internal vantage point in the manner described above.

Figure 13:
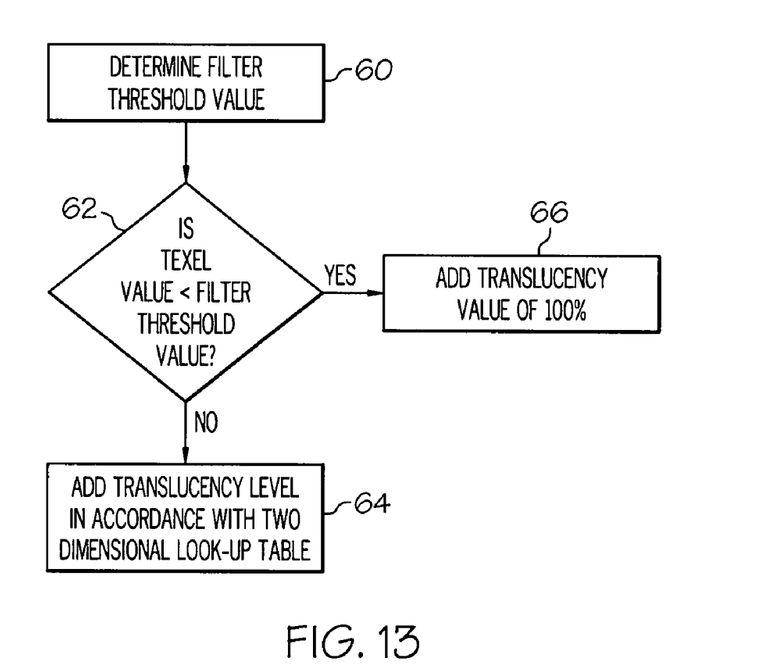
FIG. 13 is flowchart illustrating an exemplary filtering process that may be performed in conjunction with an embodiment of the inventive rendering technique.

If desired, a filtering process, which graphically suppresses extraneous data from the 3D weather image, may be utilized in conjunction with an embodiment of the inventive rendering technique. FIG. 13 is a flowchart illustrating an exemplary filtering process that may be performed by controller 14 with the rendering technique illustrated in FIG. 3. To begin (STEP 60), controller 14 determines a filter threshold value. This value may be stored in a memory associated with controller 14, or communicated to aircraft weather display system 12 from an outside source (e.g., an air traffic control tower). However, the filter threshold value is preferably determined from user selection data received via user input 20 (FIG. 1). Next, for each texel, controller 14 determines if the texel's value is less than the filter threshold value (STEP 62). If the texel value is not less than the filter threshold value (STEP 64), the translucency level may be determined in the manner described above (e.g., utilized a two dimensional look-up table, such as table 46 shown in FIG. 9. If, instead, the texel value is less than the filter threshold value (STEP 66), the texel is assigned a predetermined translucency level of, for example, approximately 100%. Thus, when the 3D weather image is displayed, each texel falling below the threshold value will appear entirely transparent and thus be graphically suppressed from the three dimensional image. If permitted to adjust the filter threshold value utilizing user input 20 (e.g., a rotatable knob), a user may effectively strip away various portions of the 3D weather image to obtain an unobstructed view of any severe weather conditions that may exist.

Considering the foregoing, it should be appreciated that there has been provided a rendering technique for generating a three dimensional image that requires minimal computational processing and, therefore, permits the three dimensional image to be continually updated to reflect changes in the three dimensional data, without reconstructing the entire object. It should further be appreciated that there has been provided an aircraft weather display system that employs such a technique to produce a three dimensional weather image indicative volumetric weather data received from, for example, a vertical scanning radar system. Although discussed above in the context of aircraft weather display systems, it should be appreciated that the inventive rendering technique may be used in a variety of different environments to produce a three dimensional image from any suitable type of volumetric data.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A rendering technique for generating a three dimensional (3D) weather image, the rendering technique carried out by an aircraft weather display system including a controller having a texture memory, a monitor deployed aboard the aircraft and operatively coupled to the controller, and a vertical scanning radar system operatively coupled to the controller, the rendering technique comprising:
    obtaining 3D weather data utilizing the vertical scanning radar system included within the aircraft weather display system;
    writing the 3D weather data into the texture memory as two dimensional (2D) slices;
    texturizing a first set of overlapping-polygons utilizing the 2D slices;
    texturizing additional sets of overlapping polygons utilizing the 2D slices, the additional sets of overlapping polygons intersecting and forming a plurality of different angles with the first set of overlapping polygons; and
    displaying the additional sets of overlapping texturized polygons with the first set of overlapping texturized polygons to produce a 3D weather image indicative of the 3D weather data.

2. A rendering technique according to claim 1 wherein the step of writing comprises slicing the 3D data along the Z-axis.

3. A rendering technique according to claim 2 wherein the first set of overlapping polygons is spaced apart along the Z-axis.

4. A rendering technique according to claim 2 wherein the step of writing further comprises slicing the 3D data along a second axis substantially perpendicular to the Z-axis.

5. A rendering technique according to claim 1 wherein each 2D slice comprises a plurality of texels, and wherein the method further comprises determining a translucency level for each texel in the plurality of texels.

6. A rendering technique according to claim 5 wherein the step of determining comprises assigning each texel a translucency level utilizing a 2D look-up table.

7. A rendering technique according to claim 5 wherein the step of determining further comprises:
   establishing a filter threshold value; and
   assigning each texel having a value surpassing the filter threshold value a translucency level of approximately 100%.

8. A rendering technique according to claim 7 wherein the step of establishing a filter threshold value comprises receiving user input indicative of a desired filter threshold value.

9. A rendering technique for generating a three dimensional (3D) weather image for use in conjunction with a weather display system including a monitor and deployed on an aircraft, comprising:
   obtaining volumetric weather data;
   writing the volumetric weather data into texture memory as two dimensional (2D) slices;
   texturizing a first set of overlapping polygons utilizing the 2D slices;
   texturizing additional sets of overlapping polygons utilizing the 2D slices, the additional sets of overlapping polygons intersecting and forming a plurality of different angles with the first set of overlapping polygons; and
   displaying the additional sets of overlapping texturized polygons with the first set of overlapping-texturized polygons to produce a 3D weather image.

10. A rendering technique according to claim 9 wherein the step of obtaining comprises receiving volumetric weather data from a vertical scanning radar system.

11. A rendering technique according to claim 9 further comprising:
   generating a perspective display on the monitor; and
   integrating the 3D weather image into the perspective display.

12. A rendering technique according to claim 9 wherein the step of displaying comprises orienting the first set of overlapping texturized polygons with respect to the aircraft.

13. A rendering technique according to claim 9 wherein each 2D slice comprises a plurality of texels, and wherein the method further comprises determining a translucency level for each texel in the plurality of texels.

14. A rendering technique according to claim 13 wherein each texel has a value associated therewith indicative of a measured weather characteristic, and wherein the step of determining comprises assigning a translucency level to each texel based upon the magnitude of the measured weather characteristic.

15. A rendering technique according to claim 14 wherein the translucency level generally increases as the magnitude of the measured weather characteristic decreases.

16. A rendering technique according to claim 14 wherein each texel is indirectly referenced within the texture memory, and wherein the step of assigning is performed once per source refresh.

17. An aircraft weather display system for use in conjunction with a volumetric weather data source, comprising:
   a monitor;
   a texture memory; and
   a controller operatively coupled to the volumetric weather data source, to the monitor, and to the texture memory, the controller configured to: (i) receive three dimensional (3D) data from the volumetric weather data source, (ii) write the 3D data into the texture memory as two dimensional (2D) slices, (iii) texturize a first set of overlapping polygons utilizing the 2D slices, (iv) texturize additional sets of overlapping polygons utilizing the 2D slices, the additional sets of overlapping polygons intersecting and forming a plurality of different angles with the first set of overlapping polygons, and (v) display the additional sets of overlapping texturized polygons with the first set of overlapping texturized polygons to produce a 3D weather image on the monitor.

18. An aircraft weather display system according to claim 17 wherein the controller is further configured to generate a perspective display on the monitor, the 3D weather image integrated into the perspective display.

* * * * *